Patented Mar. 5, 1946

2,395,954

UNITED STATES PATENT OFFICE 2,395,954

RECOVERY OF OLEFINS AND/OR DIOLEFINS FROM HYDROCARBON MIXTURES CONTAINING SAME

Newcomb K. Chaney, Rose Valley-Moylan, Pa., assignor to The United Gas Improvement Company, a corporation of Pennsylvania No Drawing. Application August 7, 1942, Serial No. 454,021

14 Claims. (Cl. 260—681.5)

This invention pertains generally to the recovery of unsaturated hydrocarbons from mixed gases containing the same and pertains particularly to such operations wherein solid dry salts of metals of groups 1 and 2 of the periodic system are employed.

I have found that when solid dry salts of the character described (that is salts substantially free from water) are employed for this purpose and whether or not the mixture containing the unsaturated hydrocarbons is in the liquid or vapor phase, there is a distinct tendency for polymerization and other side reactions to take place resulting not only in a loss of unsaturated hydrocarbon material but frequently also in deposits upon the particles of solid dry reagent. Such deposits not only reduce the activity of the reagent particles but also greatly increase the tendency for the particles to coalesce with a further reduction in activity and a substantial increase in operating difficulties.

I have discovered that side reactions of the character described as well as the deposition of reaction products upon the reagent particles may be very substantially reduced or prevented by mixing with the solid dry reagent an inorganic basic substance such as an oxide of an alkali metal and/or of an alkaline earth.

Solid dry salts of metals of groups 1 and 2 of the periodic system and particularly monovalent salts of heavy metals of these groups, such as halides, nitrates, sulfates, phosphates, formates, acetates, propionates, carbonates and lactates of copper, mercury and silver may be employed for the removal or recovery from hydrocarbon mixtures, either in the vapor or liquid phase, of diolefins and/or olefins by the formation of an association product of one or more of said unsaturated hydrocarbons with one or more of said salts under suitable temperature and pressure conditions, which association product may be afterward dissociated such as by an elevation in temperature and/or reduction in pressure, usually after separation from the unreacted material, to regenerate the unsaturated hydrocarbon or hydrocarbons and the reagent salt.

For reaction efficiency and ease of handling, it is very desirable to maintain the solid dry reagent in finely divided form during the treatment and with surfaces uncoated with secondary reaction products.

Furthermore, that portion of the reagent which becomes coated with secondary reaction products represents a loss in reagent itself. When present in considerable quantity, it may reduce the activity of the reagent to such an extent as to require a complete renewal thereof with fresh material.

By the operation of my invention the useful life of the reagent is greatly extended and the loss of unsaturated hydrocarbons by virtue of side reactions is greatly reduced.

Under suitable conditions of temperature and pressure, diolefins may be made to selectively react with reagents of the type described in preference to olefins.

Furthermore, any two or more of these classes of hydrocarbons may be caused to react with a mass of reagent salt to form a plurality of association products which, since they have different dissociation pressures, may be dissociated selectively, such as stagewise, to yield each class of hydrocarbon in more concentrated form.

Moreover, any of these classes of unsaturated hydrocarbons may be selectively removed from mixtures containing other materials.

In some instances, the tendency to form solid or semi-solid secondary reaction products by polymerization or otherwise is very pronounced and when the reagent is in a solid dry form such secondary reaction products are deposited upon the reagent particles. Such deposits not only prevent the mixture undergoing treatment from coming into proper contact with reagent particles thus coated but also tend to cause the reagent particles to agglomerate to introduce processing and handling difficulties.

While any inorganic basic substance may be mixed with the reagent salt, I prefer to select such inorganic basic materials which are either inert with respect to the reagent salt or of very low reactivity therewith.

I also prefer to employ inorganic basic substances of relatively low volatility in order that they may be retained over a longer period in admixture with the reagent salt without necessity of unduly large make-up, and without undue admixture of any volatilized basic material with recovered unsaturated hydrocarbons.

In the event that any inorganic basic substance reacts to an appreciable extent with the salts, it is preferred that such reaction product be of low vapor pressure.

It is also preferred that any salts which may be formed between the inorganic basic substance and any acidic material which might be present during the various stages of the process be readily soluble in an ordinary solvent so that, if desired, it may be readily removed from the reagent salt.

In addition, if desired, the inorganic basic substance may be chosen so that any salt formed therewith may have little tendency to hydrolyze in the presence of moisture, the presence of which is substantially unavoidable in industrial operations of the character under discussion.

Examples of inorganic basic substances which may be admixed with reagent salts of the type set forth herein are as follows:

A. Alkali metal oxides, hydroxides and carbonates such as $Na_2O$, $Na_2O_2$, $Na_2O_3$, $K_2O$, $K_2O_2$, $K_2O_3$, $K_2O_4$, $Rb_2O$, $Rb_2O_2$, $Rb_2O_3$, $Rb_2O_4$, $Cs_2O$, $Cs_2O_2$, $Cs_2O_3$, $Cs_2O_4$, $Li_2O$, $Li_2O_2$, NaOH, KOH, RbOH, CsOH, LiOH, $NaHCO_3$, $Na_2CO_3$, $KHCO_3$, $K_2CO_3$, $LiHCO_3$, $Li_2CO_3$, $RbHCO_3$, $Rb_2CO_3$, $CsHCO_3$, and $Cs_2CO_3$. Since the radical "ammonium" namely, $NH_4$ behaves in its compounds as a univalent alkali metal, ammonium compounds are for convenience grouped with those of the alkali metals. Suitable ammonium compounds for use in my invention are $NH_4HCO_3$, $(NH_4)_2CO_3$, $NH_4OCONH_2$.

B. Alkaline earth oxides, hydroxides and carbonates such as CaO, $CaO_2$, $Ca(OH)_2$, $Ca(HCO_3)_2$, $CaCO_3$, BaO, $BaO_2$, $Ba(OH)_2$, $BaCO_3$, SrO, $SrO_2$, $Sr(OH)_2$, $SrCO_3$, BeO, $Be(OH)_2$, $BeCO_3$, MgO, $Mg(OH)_2$, and $MgCO_3$.

Particularly desirable results are obtained when alkali and/or alkaline earth oxides are employed as the basic substance, such as BaO, and particularly CaO.

Any desired quantity of inorganic basic substance may be employed and this is conveniently incorporated with the solid reagent salt.

The solid reagent salt per se may be said to be dispersed since it is employed in a disintegrated form, for example, in the form of a powder to form a mass with considerable free space between the particles thereof.

Solid inorganic basic substances are preferably disintegrated the same as the reagent salt. Any proportion of the same may be mixed with the reagent salt without danger of filling up the free space between the particles thereof.

As a rule between 0.1 per cent to 10 per cent by weight of inorganic basic substance to solid reagent salt will give improved results, the exact amount required for optimum conditions depending somewhat upon the degree of moisture present in the hydrocarbon mixture to be treated. The use of 5%, or less, of inorganic basic substance will be found to give excellent results in practically all cases.

Since such hydrocarbon mixtures are usually for the most part substantially dry and usually contain hardly more than traces of moisture, two per cent by weight of inorganic basic substance based upon solid dry reagent salt present will usually be very satisfactory.

Processes of the general character to which my new reaction mass may be applied relate for the most part to the selective recovery of unsaturated hydrocarbons of less than seven carbon atoms for mixtures thereof, although they are not limited thereto.

Frequently, it is found to be technically advantageous to first resort to fractional distillation or other means to narrow the boiling range of the mixture.

Thus a $C_5$ cut may be treated to separate diolefins from olefins or a distillate fraction containing substantially no other diolefin but, say, isoprene or piperylene may be treated to segregate the respective diolefin from olefinic and any paraffinic material which might be present.

Likewise, a $C_4$ cut containing butadiene, butene and perhaps butane may be treated to segregate the butadiene in high concentration.

A $C_3$ cut or a $C_2$ cut might be treated to segregate propylene or ethylene respectively in high concentration.

The diolefins present in a given fraction may be contacted with my reaction mass under conditions of temperature and pressure such that substantially only diolefin materials are absorbed by the reaction mass. Then after removal of unreacted material the complex formed between the diolefin material and the reaction mass may be decomposed by elevation in temperature and/or reduction in pressure to revivify the reaction mass and to regenerate the diolefin material.

On the other hand, both olefins and diolefins may be absorbed at the same time and separated from each other by regulation of temperature and/or pressure during dissociation as already referred to.

The recovery of $C_5$ diolefin material from a mixture thereof containing other hydrocarbons by contacting the same with a solid dry salt of a heavy metal of groups 1 and 2 of the periodic system, is described in the copending application of Frederick Breuer, Serial Number 345,101, filed January 12, 1940, which has matured into Patent 2,359,020, dated September 26, 1944, and the recovery of butadiene from a mixture thereof containing other hydrocarbons by contacting the same with solid cuprous chloride is described in Chemical Abstracts, vol. 32, 6098–6100 (1938).

The recovery of olefins from hydrocarbon mixtures containing the same by contacting said mixtures with solid dry salts of the character referred to herein is described in U. S. Patent 2,116,157, dated May 3, 1938, and U. S. Patent 2,209,452, dated July 30, 1940.

My new reaction mass may be substituted in any of the foregoing processes with the advantages set forth herein.

While solid dry salt and solid dry inorganic basic substance are preferably mixed in finely divided form or finely divided after mixing, if desired, any one or more inorganic basic substances may be applied to the solid salt prior to contact with the material to be treated in the form of a solution or suspension in a basic or non-basic liquid, as desired, due care preferably being taken that liquid, if any, which might be left in the reaction mass when ready for use is substantially non-aqueous.

The reagent is preferably maintained in finely divided form throughout the process and for this purpose the process may be practiced in suitable apparatus for this purpose, for example, a ball mill or similar device, with the material being treated in either the liquid phase or the vapor phase or both.

It is conceivable that a mixture of solid salt and solid inorganic basic substance may be employed in the form of a slurry in a non-aqueous liquid. In such case substantial insolubility of the components of my new reagent in the non-aqueous liquid is more preferable. Thus hydrocarbon liquids might be employed for this purpose.

The advantages of having my new reagent in solid, substantially dry, finely divided form are so outstanding as to make this form of the invention particularly preferred and different from the other forms, whether the material undergoing treatment is in the liquid phase or the vapor phase.

The following examples will serve to further illustrate the invention.

Example I

In a mixing vessel equipped with heating and cooling means and connected to a receiver and pressure reducing device, 2400 grams of dry cuprous chloride powder was thoroughly mixed with 48 grams of calcium oxide.

150 grams of a 74% isoprene fraction was then mixed with the reagent salt and permitted to react therewith for approximately one hour at a temperature between approximately 15 to 20° C. while thoroughly agitating the mass to maintain the reagent in finely divided form. The unabsorbed hydrocarbon material was then removed from the system by reducing the pressure to between 200 and 600 mm. of mercury while maintaining the temperature at approximately 15° C., continuing the agitation as before.

After the removal of the unabsorbed material an intermediate fraction was obtained by further reducing the pressure to 40 mm. of mercury.

Then upon maintaining approximately the latter pressure, the temperature was raised slowly to approximately 60° C. to obtain a 90% yield of the isoprene present in the original fraction in a concentration of 98.5%.

Example II

A 70% light oil piperylene fraction, containing 24% amylenes and 6% pentanes, was concentrated according to the method outlined in Example I, a mixture comprising 98 parts of dry, powdered cuprous chloride and 2 parts calcium oxide being employed as the concentrating agent.

An 82% yield of the piperylene present in the original fraction, in the form of a product containing 98% piperylene, was obtained.

Example III

A 50% light oil butadiene fraction, containing 48% butylenes and 2% butanes, was treated with an absorbent comprising 98 parts of finely divided cuprous chloride and 2 parts of calcium oxide for a period of one hour at a temperature of −10° C., while thoroughly agitating the reaction mass to maintain the reagent in finely divided form after which the butylenes and butanes present were largely removed by reducing the pressure on the system and simultaneously raising the temperature to 25° C., continuing the agitation as before.

Upon increasing the temperature slowly to 60° C., a small quantity of an intermediate fraction containing 50% butadiene was obtained. Further heating at a temperature above 60° C. resulted in the isolation of 85% of the butadiene present in the original fraction in the form of an 88.5% product.

I find that in the practice of my invention as the number of cycles of operation increases some polymer accumulates. This polymer is of a character different from that formed when my invention is not employed in that it does not interfere markedly with the efficiency of the solid salt.

Furthermore, as the quantity of polymer increases its rate of formation decreases. For example, during the first few cycles of operation polymer may be formed at the rate of approximately ½% per cycle based on solid salt. This rate decreases as the number of cycles increases so that when the number of cycles reaches say 100, the rate of formation of polymer is found to have dropped to $\frac{1}{10}$ to $\frac{1}{100}$% per cycle.

In each of the foregoing examples, the elimination of the inorganic basic substance from the absorbent resulted in a substantial deposition of insoluble polymer in the cuprous chloride absorbent. The rate of deposition was so rapid in each case as to render the further use of the absorbent impracticable after only a very few cycles of operation.

As indicated previously, one or more inorganic basic substances may be employed for my purpose.

I prefer to use solid inorganic basic substances, and particularly substantially water free alkali, and/or alkaline earth oxides. These oxides function not only as basic substances but also as drying agents. The latter is particularly true of CaO, BaO, and MgO.

By the use of a drying agent moisture is taken up and a substantially non-aqueous system more readily maintained.

While the use of drying agents (when employed) which are also basic substances is preferred, it is to be understood that other suitable drying agents may be added to supplement the drying action of any such basic substance and/or may be used with those basic substances which may be deficient or incapable of drying action.

Other inorganic basic substances which are capable of acting as drying agents are fused KOH and fused NaOH.

Other drying agents are fused $CaCl_2$, perborates, such as barium perborate, various commercial driers, etc.

Suitable drying agents may depend on chemical and/or physical action and preferably are inert in the environment or of such a character as not to interfere considerably with the efficiency of the separation of olefins and/or diolefins as described herein.

Another manner of assuring a substantially non-aqueous system is to subject the mixture undergoing treatment either in the liquid or vapor phase to a drying action prior to contacting with the solid salt in accordance with my invention, that is, prior to contact with the solid salt in the presence of an inorganic basic substance with or without the presence of a material capable of a drying function.

Pre-drying of the material to be treated may be effected to any desired extent by contacting said material either in the liquid or in the vapor phase with a suitable drying agent such as any of the drying agents set forth herein including the various inorganic basic substances which are also capable of functioning as drying agents.

Thus the material to be treated may be first contacted, for example, with calcium oxide to substantially reduce its moisture content prior to contact with the reagent mass comprising solid salt and an inorganic basic substance with or without the presence of a material capable of a drying function.

Such drying function is present, for example, in a reaction mass comprising solid salt and calcium oxide.

Any suitable or desirable amount of drying agent may be employed such as, for example, between 0.1% and 10% based on solid dry salt.

A number of solid, dry salts of the heavy metals of groups 1 and 2 of the periodic system may be employed together for concentrating olefins, and particularly diolefins, the monovalent salts being preferred. Excellent results may be obtained by the use of one or more monovalent salts of silver, copper, or mercury.

An outstanding feature of my invention is that it is preferably carried out in a substantially non-aqueous system, or in other words in the substantial absence of water. Since in industrial processes of this general character the presence of some moisture is unavoidable, such moisture preferably should not be permitted to accumulate in quantities greater than 2% by weight of solid dry salt and more preferably not greater than 1% by weight of said salt. Substantially lower tolerances are recommended.

Conceivably larger quantities of water may be present with the realization of some of the advantages of my invention but with a sacrifice of others.

In the specification and the claims, the term "inorganic basic substance" is intended to define one or more inorganic materials capable of reacting with, and neutralizing, an acid or an acidic material.

The term "calcium oxide" when used in the specification and in the claims means the compound having the formula CaO.

While various procedures have been particularly described, these are of course subject to considerable variation. Therefore, it will be understood that the foregoing specific examples are given by way of illustration, and that changes, omissions, additions, substitutions, and/or modifications might be made within the scope of the claims without departing from the spirit of the invention.

I claim:

1. A process for separating in more concentrated form an unsaturated hydrocarbon selected from the group consisting of olefins and diolefins from a hydrocarbon mixture containing said unsaturated hydrocarbon to be separated and hydrocarbon material of lesser unsaturation than said unsaturated hydrocarbon to be separated, which comprises contacting said mixture with a reagent comprising an intermixture of a solid inorganic basic substance and a solid monovalent salt of a metal selected from the group consisting of copper, mercury and silver, said contact taking place in a substantially non-aqueous system and under conditions of temperature and pressure such as to form an association product of said salt and said unsaturated hydrocarbon to be separated, removing non-associated hydrocarbon material from said association product, and thereafter dissociating said association product to recover said unsaturated hydrocarbon in more concentrated form.

2. A process for separating in more concentrated form an unsaturated hydrocarbon selected from the group consisting of olefins and diolefins from a hydrocarbon mixture containing said unsaturated hydrocarbon to be separated and hydrocarbon material of lesser unsaturation than said unsaturated hydrocarbon to be separated, which comprises contacting said mixture with a reagent comprising a finely divided intermixture of a solid monovalent salt of a metal selected from the group consisting of copper, mercury and silver with a solid inorganic basic substance of low volatility and substantially inert with respect to said salt, said contact taking place in the absence of more than 2% by weight of water based on solid dry salt and under conditions of temperature and pressure such as to form an association product of said salt and said unsaturated hydrocarbon to be separated, removing non-associated hydrocarbon material from said association product, and thereafter dissociating said association product in a manner to recover said unsaturated hydrocarbon in more concentrated form.

3. A process for separating in more concentrated form an unsaturated hydrocarbon selected from the group consisting of olefins and diolefins from a hydrocarbon mixture containing said unsaturated hydrocarbon to be separated and hydrocarbon material of lesser unsaturation than said unsaturated hydrocarbon to be separated, which comprises contacting said mixture with a reagent comprising a finely divided intermixture of solid cuprous chloride and from 0.1% to 10% by weight based on said cuprous chloride of a solid inorganic basic substance of low volatility and substantially inert with respect to said cuprous chloride, said contact taking place in the absence of more than 1% by weight of water based on said cuprous chloride and under conditions of temperature and pressure such as to form an association product of said cuprous chloride and said unsaturated hydrocarbon to be separated, removing non-associated hydrocarbon material from said association product, and thereafter dissociating said association product to recover said unsaturated hydrocarbon in more concentrated form.

4. In a process for separating in more concentrated form an unsaturated hydrocarbon selected from the group consisting of olefins and diolefins from a hydrocarbon mixture containing said unsaturated hydrocarbon to be separated and hydrocarbon material of lesser unsaturation than said unsaturated hydrocarbon to be separated, in which said mixture is contacted with solid cuprous chloride in a substantially non-aqueous system and under conditions of temperature and pressure such as to form an association product of said cuprous chloride and said unsaturated hydrocarbon to be separated, in which non-associated hydrocarbon material is removed from said association product, and in which said association product is thereafter dissociated to recover said unsaturated hydrocarbon in more concentrated form, the improvement which comprises employing said solid cuprous chloride in the form of a finely divided intermixture with solid calcium oxide.

5. A process for separating diolefin material in more concentrated form from a mixture containing said diolefin material and olefin material, which comprises contacting said mixture with a reagent comprising a finely divided intermixture of a solid monovalent salt of a metal selected from the group consisting of copper, mercury and silver with a solid inorganic basic substance of low volatility and substantially inert with respect to said salt, said contact taking place in a substantially non-aqueous system and under conditions of temperature and pressure such as to form an association product of said salt and said diolefin material, removing olefin material from said association product, and thereafter dissociating said association product in a manner to recover said diolefin material in more concentrated form.

6. In a process for separating diolefin material of less than 7 carbon atoms per molecule in more concentrated form from a hydrocarbon mixture containing said diolefin material and olefin material, in which said mixture is contacted with a reagent in a substantially non-aqueous system and under conditions of temperature and pressure such as to form an association product of said reagent and said diolefin material, in which olefin material is removed from said association product, and in which said association product is thereafter dissociated to recover said diolefin material in more concentrated form, the improvement which comprises employing as said reagent a finely divided mixture of solid cuprous chloride and up to 10% by weight based on said cuprous chloride of solid inorganic basic oxide.

7. In a process for separating diolefin material of less than 7 carbon atoms per molecule in more concentrated form from a hydrocarbon mixture containing said diolefin material and olefin material, in which said mixture is contacted with a reagent in a substantially non-aqueous system and under conditions of temperature and pressure such as to form an association product of said reagent and said diolefin material, in which olefin material is removed from said association product, and in which said association product is thereafter dissociated to recover said diolefin material in more concentrated form, the improvement which comprises employing as said reagent a finely divided mixture of solid cuprous chloride and up to 10% by weight based on said cuprous chloride of solid alkaline earth oxide.

8. In a process for separating diolefin material of less than 7 carbon atoms per molecule in more concentrated form from a hydrocarbon mixture containing said diolefin material and olefin material, in which said mixture is contacted with a reagent in a substantially non-aqueous system and under conditions of temperature and pressure such as to form an association product of said reagent and said diolefin material, in which olefin material is removed from said association product, and in which said association product is thereafter dissociated to recover said diolefin material in more concentrated form, the improvement which comprises employing as said reagent a finely divided mixture of solid cuprous chloride and up to 10% by weight based on said cuprous chloride of solid calcium oxide.

9. A process for separating butadiene in more concentrated form from a hydrocarbon mixture containing butadiene and butylene material, which comprises contacting said mixture with a reagent comprising a finely divided intermixture of solid cuprous chloride and solid alkaline earth oxide, said contact taking place in the absence of more than 1% by weight of water based on said cuprous chloride and under conditions of temperature and pressure such as to form an association product of said cuprous chloride and butadiene, removing butylene material from said association product, and thereafter dissociating said association product to recover butadiene in more concentrated form.

10. A process for separating piperylene in more concentrated form from a hydrocarbon mixture containing piperylene and amylene material, which comprises contacting said mixture with a reagent comprising a finely divided intermixture of solid cuprous chloride and solid alkaline earth oxide, said contact taking place in the absence of more than 1% by weight of water based on said cuprous chloride and under conditions of temperature and pressure such as to form an association product of said cuprous chloride and piperylene, removing amylene material from said association product, and thereafter dissociating said association product to recover piperylene in more concentrated form.

11. A process for separating isoprene in more concentrated form from a hydrocarbon mixture containing isoprene and amylene material, which comprises contacting said mixture with a reagent comprising a finely divided intermixture of solid cuprous chloride and solid alkaline earth oxide, said contact taking place in the absence of more than 1% by weight of water based on said cuprous chloride and under conditions of temperature and pressure such as to form an association product of said cuprous chloride and isoprene, removing amylene material from said association product, and thereafter dissociating said association product to recover isoprene in more concentrated form.

12. In a process for separating butadiene in more concentrated form from a hydrocarbon mixture containing butadiene and butylene material, in which said mixture is contacted with a reagent in a substantially non-aqueous system and under conditions of temperature and pressure such as to form an association product of said reagent and butadiene, in which butylene material is removed from said association product, and in which said association product is thereafter dissociated to recover butadiene in more concentrated form, the improvement which comprises employing as said reagent a finely divided mixture of solid cuprous chloride and from 0.1% to 10% by weight based on said cuprous chloride of solid calcium oxide.

13. In a process for separating piperylene in more concentrated form from a hydrocarbon mixture containing piperylene and amylene material, in which said mixture is contacted with a reagent in a substantially non-aqueous system and under conditions of temperature and pressure such as to form an association product of said reagent and piperylene, in which amylene material is removed from said association product, and in which said association product is thereafter dissociated to recover piperylene in more concentrated form, the improvement which comprises employing as said reagent a finely divided mixture of solid cuprous chloride and from 0.1% to 10% by weight based on said cuprous chloride of solid calcium oxide.

14. In a process for separating isoprene in more concentrated form from a hydrocarbon mixture containing isoprene and amylene material, in which said mixture is contacted with a reagent in a substantially non-aqueous system and under conditions of temperature and pressure such as to form an association product of said reagent and isoprene, in which amylene material is removed from said association product, and in which said association product is thereafter dissociated to recover isoprene in more concentrated form, the improvement which comprises employing as said reagent a finely divided mixture of solid cuprous chloride and from 0.1% to 10% by weight based on said cuprous chloride of solid calcium oxide.

NEWCOMB K. CHANEY.